United States Patent [19]

Weber

[11] 4,335,414
[45] Jun. 15, 1982

[54] AUTOMATIC RESET CURRENT CUT-OFF FOR AN ELECTROSTATIC PRECIPITATOR POWER SUPPLY

[75] Inventor: William G. Weber, West Chester, Ohio

[73] Assignee: United Air Specialists, Inc., Cincinnati, Ohio

[21] Appl. No.: 202,314

[22] Filed: Oct. 30, 1980

[51] Int. Cl.³ .............................................. H02H 3/24
[52] U.S. Cl. .................................... 361/100; 55/105; 323/903; 363/21; 363/28; 361/92
[58] Field of Search ..................... 361/92, 94, 100, 91, 361/93, 235; 363/20, 21, 27, 28; 55/105, 139; 323/903, 242, 243, 244, 246

[56] References Cited

U.S. PATENT DOCUMENTS

| | | | |
|---|---|---|---|
| 3,599,082 | 8/1971 | Besier | 323/242 |
| 4,061,961 | 12/1977 | Baker | 323/903 X |
| 4,156,885 | 5/1979 | Baker et al. | 361/92 X |

*Primary Examiner*—Reinhard J. Eisenzopf
*Attorney, Agent, or Firm*—Frost & Jacobs

[57] ABSTRACT

An automatic electronic reset current cut-off protection circuit for electrostatic precipitator air cleaner power supplies of the type utilizing a ferroresonant transformer having a primary winding, a secondary winding for producing relatively high voltage and a tertiary winding for producing a relatively low voltage. The circuit operates to inhibit power supply operation in the event of an overload in the ionizer or collector cell by sensing a voltage derived from the high voltage and comparing the sense voltage with a fixed reference. When the sense voltage falls below a predetermined value, current through the transformer primary is inhibited for a predetermined time. Current flow is automatically reinstated and the circuit will cyclically cause the power supply to shut down until the fault has cleared. The reference voltage is derived from the tertiary winding voltage resulting in increased sensitivity of the circuit to short duration overload conditions.

15 Claims, 2 Drawing Figures

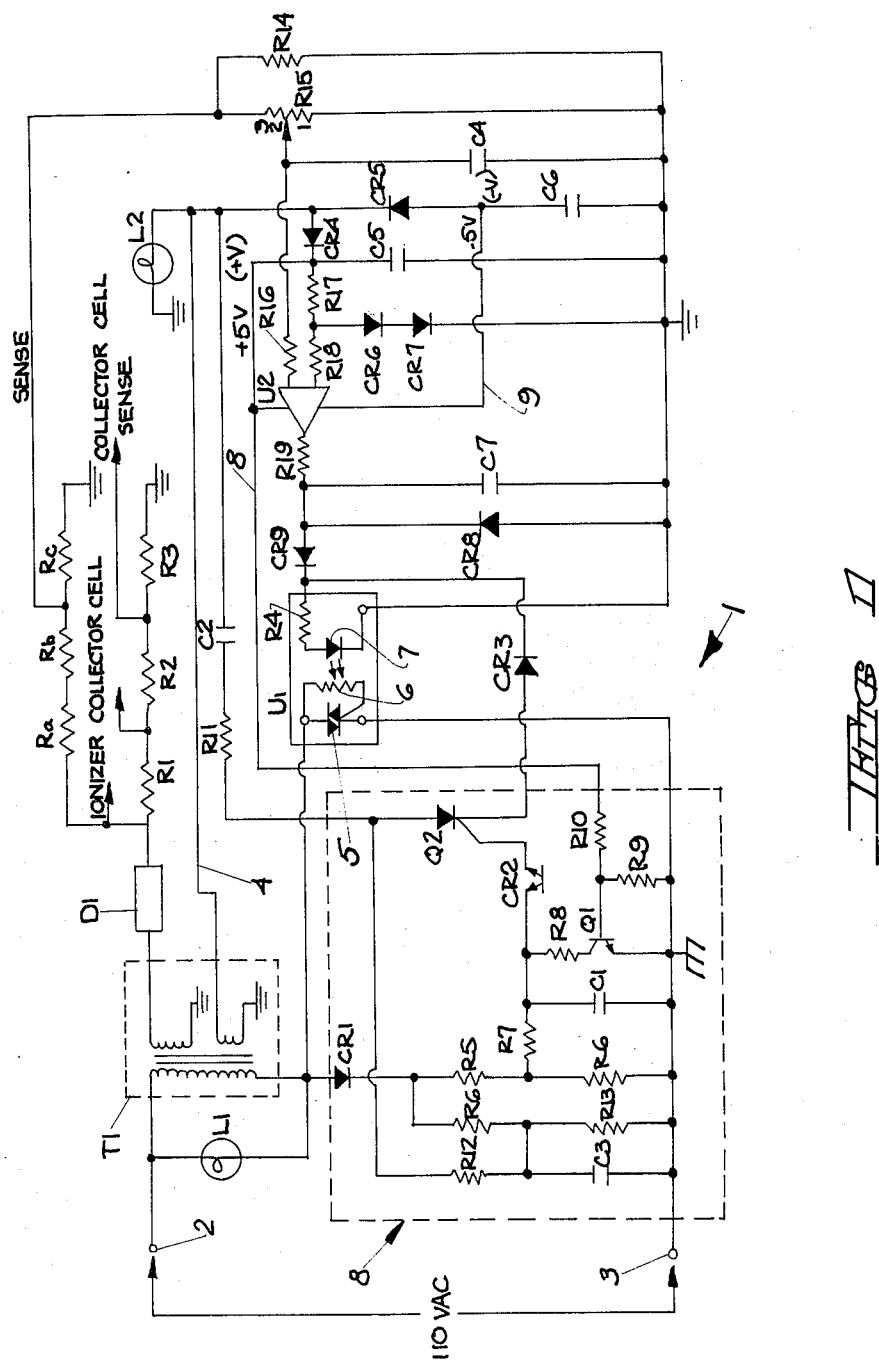

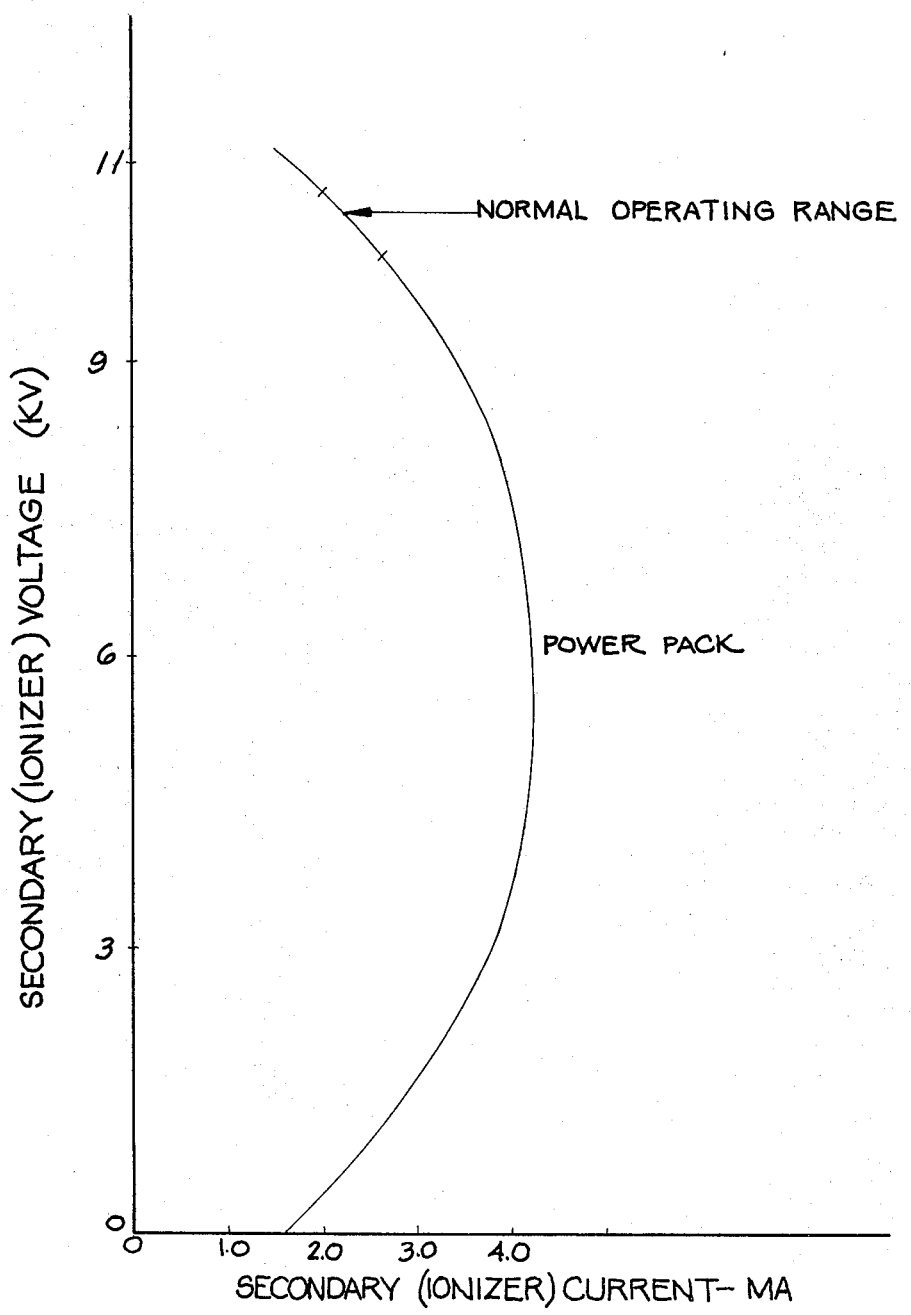

AUTOMATIC RESET CURRENT CUT-OFF FOR AN ELECTROSTATIC PRECIPITATOR POWER SUPPLY

SUMMARY OF THE INVENTION

The present invention relates generally to electrostatic precipitators, and more particularly to an electronic circuit for protecting the high voltage power supply associated with such an electrostatic precipitator.

In a conventional electrostatic precipitator air cleaner, a power supply or power pack supplies a relatively high DC voltage to an ionizer for charging airborne particles drawn into the precipitator. A collecting cell comprising a plurality of spaced plates, some of which may also be charged to a relatively high DC voltage, is positioned downstream from the ionizer section of the precipitator and serves to collect, by electrostatic attraction or repulsion, airborne particles charged by the ionizer.

Under ideal conditions, voltage levels are employed which produce the necessary electrostatic field strength consistent with electrode spacing, while avoiding arcing or sparking between the electrodes. However, as load changes to the power supply occur caused by changes in atmosphere or contaminant conditions, the output voltages supplied to the ionizer and collecting cells will fluctuate.

As contaminants are accumulated by the precipitator collecting cells, it is not uncommon for intermittent arcing, which may progress to an essentially continuous or short circuit condition, to occur between the highly charged surfaces and ground within the precipitator. It is well known that the occurrence of such sparking and arcing usually involves a larger current flow which disrupts the operation of the precipitator, causes low collection efficiency because of the reduction in the applied voltage, and may also damage the precipitator components. For example, overload currents caused by collecting cell arcing may produce cell voltages less than that required to trap charged particles, resulting in large numbers of the charged particles being exhausted into the area to be treated.

It has also been found that in conventional electrostatic precipitator power supplies, even transient overload conditions of very short duration may result in damage to the electrical and electronic components of the precipitator.

In view of these problems, it has been found desirable to provide protection means for the precipitator power supply in order to alert the operator of an overload condition and as well as protect the electrostatic precipitator power supply and other components against dangerous overloads. One method which has been suggested involves regulating the high voltage supply to the ionizer and collecting cells over a desired range of operating currents. However, such regulation techniques have not proved entirely acceptable due to their inability to hold the high voltage within close limits regardless of load fluctuations without the need for expensive and complex electronic and electro-mechanical components. Furthermore, such known regulators often rely on voltage or current changes taking place in the primary or low voltage section of the power supply which may not accurately reflect the actual state of affairs in the high voltage section.

Another method for protecting electrostatic precipitator power supplies against overload conditions utilizes a fuse or circuit breaker in the transformer primary circuit to protect the power supply components from destructively high current levels. Often, however, an overload condition may exist in the transformer secondary of sufficient intensity to cause problems below the level necessary to trigger the protective means in the primary circuit of the transformer. It also requires a manual reset for a condition that may have been temporary.

It is also known in the prior art to employ ferroresonant circuits in the transformer secondary to protect against a continuous short circuit condition. An example of such a device is illustrated in U.S. Pat. No. 4,156,885 issued May 29, 1979 to F. C. Baker et al. In this type of circuit, a tertiary winding is utilized in association with the transformer which develops an output voltage which decreases as the current supplied by the transformer increases. This output voltage is used through sensing circuitry to deactivate a switch in the transformer primary to inhibit power supply operation in the event of an overload. In some instances, however, it has been found that the conditions sensed by the tertiary winding may not accurately reflect the true conditions present in the secondary winding of the transformer.

In U.S. Pat. No. 4,061,961 issued Dec. 6, 1977 to F. C. Baker et al., the operating conditions in the transformer primary are sensed, and used to inhibit power supply operation in the event of excessive current conditions. Again, however, the state of affairs existing with respect to overload currents in the transformer primary may not accurately reflect the true current conditions occurring in the secondary of the transformer, particularly for high current arcs of short duration.

The present invention is directed to improved circuitry for automatically sensing overload current conditions or low voltage conditions, particularly of very short duration, in the ionizer or collecting cell, and inhibiting power supply operation until the overload condition has cleared. The circuit includes means for automatically resetting the sensing circuitry to periodically enable power supply operation. In a preferred embodiment, the circuit of the present invention is designed to operate with a two stage electrostatic precipitator air cleaner of the type having an ionizer for charging airborne particles, a collecting cell for collecting the charged particles and power supply means responsive to a primary voltage for providing relatively high voltage to the ionizer and the cell. The power supply includes a transformer having a primary winding, a secondary winding for producing relatively high voltage, and means utilizing the high voltage to charge the ionizer and the collecting cell. The invention is characterized by an improved automatic electronic protection circuit for the power supply which includes electronic switch means connected in series with the transformer primary for permitting current flow through the primary upon application of an enabling signal to the switch means. Timing means shunt the switch means and produce the enabling signal a predetermined time after primary voltage is initially applied to the power supply or the switch means operates to inhibit current flow through the primary winding. Attenuator means are provided in association with the high voltage secondary winding to produce a sense voltage representative of the voltage and current supplies to the ionizer or the collecting cell. Comparison means compare this sense voltage to a reference voltage to produce an inhibit signal when the voltage or current supplied to the ionizer or the collector cell fall outside normal operating limits. In one embodiment, the reference voltage is created by a tertiary winding associated with the transformer. Furthermore, the transformer may be of the ferroresonant type where output voltage is a function of current supplied by the transformer.

As will be explained in more detail hereinafter, the timing means supplies a timing pulse to the switch means approximately five seconds after power is initially applied to the power supply. If excessive current is not being drawn from the ionizer or collecting cell, a sense voltage within normal operating limits is applied to the comparison means. At or about the same time, a voltage produced by the tertiary winding is also supplied to the comparison means, which supplies an output signal for enabling the switch means after cessation of the enabling signal produced by the timing means.

In the event that excessive current is drawn from the ionizer, the high voltage produced by the secondary winding will decrease by virtue of the ferroresonant nature of the transformer, causing the sense voltage to decrease and an inhibit signal to be applied to the switch means. After the five second delay, the enabling signal is applied to the switch means for approximately one half second to re-establish the high voltage at the ionizer. If the fault has not been cleared, the operation will be repeated indefinitely until the fault clears, or operation is terminated manually. Similar operation may be obtained by monitoring the collector cell current or if a failure occurs in the tertiary winding.

Further features of the invention will become apparent from the detailed description which follows.

BRIEF DESCRIPTION OF THE DRAWING

FIG. 1 is a schematic diagram of the automatic reset current cut-off circuit of the present invention.

FIG. 2 is a graphical representation of the transformer characteristics of the present invention.

DETAILED DESCRIPTION

The schematic diagram of the automatic reset current cut-off circuit of the present invention is illustrated generally at 1 in FIG. 1. Primary alternating voltage is applied to circuit 1 between input terminals 2 and 3, the latter terminal serving as ground. Terminal 2 is connected to one input of the primary winding of transformer T1, which may be of the ferroresonant type. An indicator lamp L1 is connected across the primary winding of transformer T1 to provide a visual indication when power is applied to circuit 1. The secondary winding of transformer T1 is configured to produce relatively high voltage and is connected through rectification means D1 to attenuator means comprising a resistor divider made up of series connected resistors R1, R2 and R3. The high voltage for the ionizer is taken directly from the high voltage output of the secondary winding. The high voltage for the precipitator collector cell is taken from the junction of resistors R1 and R2, and will generally be somewhat less than the voltage applied to the ionizer. A SENSE voltage for monitoring collector cell voltage is derived from the junction of resistors R2 and R3, and will generally be of the order of several volts. Alternatively, a SENSE voltage representative of the ionizer voltage may be derived by means of a resistor divider formed by resistor Ra, Rb and Rc. However, for purposes of an exemplary showing, the SENSE voltage will be described hereinafter as derived from the ionizer voltage through divider Ra, Rb and Rc. The purpose and function of the SENSE voltage derived in either manner will be described in more detail hereinafter.

Transformer T1 also includes a tertiary winding which supplies a relatively low voltage on output line 4, to drive an indicator lamp L2.

The characteristics of ferroresonant transformer T1 are illustrated in the graphical representation shown in FIG. 2. In general, in the normal operating range of the transformer, secondary voltage decreases with increasing secondary current. In the usual electrostatic precipitator power supply application, most of the current is supplied to the ionizer. Consequently, the voltage measured at the secondary winding output (which is the same as the ionizer voltage) reflects the amount of current being supplied to the ionizer. It will also be observed that the SENSE voltage will be proportional to the secondary winding voltage, and consequently representative of ionizer voltage and current.

In an alternative embodiment where the SENSE voltage is derived through the resistor divider R1-R3, changes in the current drawn by the collector cell will be reflected in the voltage drop across resistor R1. As a result, the SENSE voltage is also representative of the voltage and current of the collector cell. Consequently, the attenuator means formed by the resistor divider can produce a SENSE voltage representative of the voltage and current supplied to the ionizer or the collector cell. Consequently, increase in the ionizer or collector cell current will cause a corresponding decrease in the SENSE voltage.

Electronic switch means comprising a triac 5 is connected between the remaining terminal of the primary winding of transformer T1 and ground. The gate terminal of triac 5 is connected to a light responsive resistor 6 which is optically coupled to light emitting diode 7. Light emitting diode 7 may be illuminated by application of an appropriate enabling voltage signal to the anode of the diode through current limiting resistor R4. It will be understood that components just described in connection with triac 5 may form a solid state relay U1.

It will be observed that the application of an appropriate enabling signal to the input of solid state relay U1 permits current flow to take place through the primary winding of transformer T1. Likewise, the absence of such an enabling signal inhibits current flow through the transformer primary winding to disable the power supply.

Timing means designated generally at 8 shunt the switch means and produce the enabling signal a predetermined time after primary voltage is initially applied to power supply 1 or the switch means operates to inhibit current flow through the primary winding of the transformer. The timing means includes a diode CR1 having its anode connected to the junction of the primary winding of the transformer and triac 5 and its cathode connected to a resistor divider formed by resistors R5 and R6. The junction of these resistors is connected through resistor R7 to timing capacitor C1, resistor R8, and one terminal of diac CR2. The remaining terminal of capacitor C1 is connected to ground. The remaining terminal of resistor R8 is connected to the collector of reset transistor Q1, whose emitter is connected to ground, and whose base is connected to the junction of resistors R9 and R10. The remaining terminal of resistor R9 is connected to ground, while the remaining terminal of resistor R10 is connected to the positive DC supply as will be described in more detail hereinafter. The remaining terminal of diac CR2 is connected to the gate terminal of SCR Q2. The cathode of SCR Q2 is connected through diode CR3 to the enable signal line at the input of solid state relay U1, while the anode of SCR Q2 is connected to the junction of resistor R11 and resistor R12. Resistor R11 is connected through capacitor C2 to output line 4 from the tertiary winding of transformer T1, while the remaining terminal of resistor R12 is connected to ground through the parallel combination of capacitor C3 and resistor R13.

Referring to the right-hand portion of the circuit illustrated in FIG. 1, the SENSE voltage is applied through resistor R14 to ground, and to sensitivity adjustment potentiometer R15. The voltage on the wiper of the potentiometer is filtered by means of capacitor C4 to ground and is applied through input resistor R16 to the non-inverting terminal of comparator U2.

Output line 4 from the tertiary winding of transformer T1 is applied to the anode of diode CR4 and the cathode of diode CR5. The cathode of diode CR4 forms a positive DC supply line 8 which is filtered by capacitor C5. A positive supply line 8 is connected through resistors R17 and R18 to the inverting input of comparator U2. The junction of resistors R17 and R18 is clamped to a 1.4 volt reference level by forward biased diodes CR6 and CR7. Positive supply line 8 also forms the positive supply voltage for comparator U2 and is connected to the remaining terminal of resistor R10.

The anode of diode CR5 forms a negative supply line 9 which is filtered by capacitor C6 and forms the supply voltage for comparator U2.

The output from comparator U2 is connected through resistor R19 to the junction of filter capacitor C7, the cathode of clamp diode CR8, and the anode of diode gate CR9. The remaining terminal of capacitor C7 and the anode of diode CR8 are connected to ground, while the cathode of diode gate CR9 is connected to the enable input terminal of solid state relay U1.

The operation of the automatic reset current cut-off circuit 1 of the present invention will now be described. Upon initial application of primary power to terminals 2 and 3 through the primary winding of transformer T1, timing capacitor C1 is charged through diode CR1, resistor R5 and resistor R7. At the same time, capacitor C3 is charged to a lower voltage through the voltage divider formed by resistors R6 and R13.

When the voltage on capacitor C1 reaches the breakover voltage of diac CR2, a short trigger pulse is applied to the gate terminal of SCR Q2 to turn the SCR on. The charge stored on capacitor C3 is applied to resistor R12, SCR Q2 and diode CR3 to form the enable signal input to solid state relay U1 and illuminate light emitting diode 7. In the preferred embodiment, the component values are chosen such that the time duration of the enable signal applied to solid state relay U1 is approximately one half second.

With light emitting diode 7 illuminated, a trigger pulse is applied to the gate terminal of triac 5 through light sensitive resistor 6 which effectively grounds the primary transformer winding terminal connected to triac 5. This action causes voltages to be induced in the secondary and tertiary windings of the transformer, which in turn causes voltage to be supplied to the ionizer, the collector cell, the SENSE line, and tertiary winding output line 4.

As noted above, the output on tertiary winding line 4 produces a filtered positive DC supply voltage on line 8 and a filtered negative DC supply voltage on line 9 for biasing comparator U2 and establishing the reference voltage at the junction of resistors R17 and R18. In general, filter capacitor C5 serving the positive supply voltage will be larger than filter capacitor C6 serving the negative supply voltage in order to establish a stable reference voltage at the inverting terminal of comparator U2.

As the positive supply voltage on line 8 rises, reset transistor Q1 is turned on through resistor R10 to clamp timing capacitor C1 to ground. In a preferred embodiment, the component values are chosen such that the delay time between initial application of power to terminals 2 and 3 and the turn-on of transistor Q1 is approximately 5 seconds.

During normal operation of the electrostatic precipitator, the conditions just described prevail. However, as described hereinabove, overload conditions may exist where the ionizer or collector cell currents or voltages lie outside normal operating limits. For example, excessive current may be drawn from the ionizer resulting in diminished high voltage from the secondary winding of transformer T1 due to the ferroresonant characteristics of the transformer. Likewise, excessive current supplied to the collector cell is reflected in diminished collector cell voltage because of the voltage drop across resistor R1.

Depending upon the embodiment selected, the SENSE signal, which is an attenuated portion of the high voltage output supplied to the ionizer or collecting cell, will decrease. When the voltage applied to the non-inverting input of comparator U2 becomes less than the reference voltage established at the inverting input, the output from the comparator will change state resulting in a negative output. Resistor R19 and capacitor C7 serve to eliminate high frequency oscillations which may appear in the comparator output for operation near the switch point. Clamp diode CR8 eliminates negative excursions of the signal so that the signal applied to the anode of diode gate CR9 switches between approximately ground and a positive voltage.

Under normal operating conditions, the output from comparator U2 will be a positive voltage, resulting in an enable signal being applied to the input terminal of solid state relay U1 which causes light emitting diode 7 to be turned on thereby turning on triac 5 and permitting current flow through the primary winding of transformer T1. However, in the event that the voltage applied to the non-inverting terminal of comparator U2 becomes less than the reference voltage established at the inverting terminal of the comparator, the signal applied to the anode of gate diode CR9 will become approximately a ground level, producing an inhibit signal to extinguish light emitting diode 7 thereby terminating current flow through the primary winding. At the same time the positive voltage on line 8 decreases in a period determined by the time constant associated with capacitor C5 to turn transistor Q1 off, thereby unclamping capacitor C1 and permitting it to begin charging toward the level established by resistors R5 and R6.

With the switch means turned off, a voltage is again applied through diode CR1 to begin charging timing capacitor C1 and the process described hereinabove for initial turn-on of the power supply circuit is repeated. In the event that the fault causing the overload condition is not cleared, the circuit will continue to cycle in the manner described until manually cleared.

In summary, when power is initially applied to circuit 1, a turn-on pulse is produced. The power supply including transformer T1 is allowed to turn-on for approximately one half second. During this one half second period, comparator U2 monitors the high voltage output via the SENSE signal. If the SENSE signal is greater than the reference established at the inverting input to the comparator, the comparator output will rise to a positive voltage value to maintain the on condition of solid state relay U1 after termination of the turn-on pulse. If the SENSE signal is less than the reference voltage established at the inverting input of comparator U2, the comparator output will swing to a negative voltage, inhibiting the switch means and immediately disabling the power supply including transformer T1. Approximately five seconds later, the circuit will produce another turn-on pulse, and the comparator again monitors the high voltage output via the SENSE signal. If the overload condition still exists, the power supply will again be disabled. This cyclic mode of operation will continue until the overload condition has been cleared.

It will be observed that inasmuch as the automatic reset current cut-off circuit 1 of the present invention monitors a voltage derived directly from the high voltage transformer secondary output, the response time of the circuit is very fast. It has been found that only one arc to ground from the ionizer is sufficient to initiate the events described hereinabove and inhibit power supply operation. This feature is considered to be very important in avoiding the problems described hereinabove, and represents an important improvement over prior art power supply protection circuit designs which rely on indirect methods of monitoring the high voltage output such as through primary winding current or voltage produced by the tertiary winding. Consequently, the sensitivity of the circuit of the present invention is greatly improved over prior art designs. Furthermore, the sensitivity may be adjusted by means of potentiometer R15 to the particular operating range desired. In the preferred embodiment illustrated where a 1.4 volt reference level is established at the junction of resistors R17 and R18, the maximum voltage swing permitted on the wiper terminal of sensitivity adjustment potentiometer R15 will be approximately two volts. These values will insure reliable operation of the electrostatic precipitator over the operating range illustrated in FIG. 2 in order to avoid excessively high ionizer or collector cell currents or abnormally low ionizer or collector cell voltages.

It will be understood that various changes in the details, materials, steps and arrangements of parts, which have been herein described and illustrated in order to explain the nature of the invention, may be made by those skilled in the art within the principle and scope of the invention as described in the appended claims.

The embodiments of the invention in which an exclusive property or privilege is claimed are as follows:

1. In a two stage electrostatic precipitator air cleaner of the type having an ionizer for charging airborne particles, a collecting cell for collecting the charged particles and power supply means responsive to a primary voltage for providing relatively high voltage to said ionizer and said cell comprising a ferroresonant transformer having a primary winding, a secondary winding for producing relatively high voltage, and means utilizing said high voltage to charge said ionizer and said collecting cell, the improvement in combination therewith comprising automatic electronic protection circuitry for said power supply including:
   electronic switch means connected in series with said transformer primary winding for permitting current flow through the primary winding upon application of an enabling signal to said switch means;
   timing means shunting said switch means for producing said enabling signal a predetermined time after primary voltage is initially applied to said power supply or said switch means operates to inhibit current flow through said primary winding;
   attenuator means for producing a sense voltage representative of the voltage applied to said ionizer;
   comparison means for comparing said sense voltage to a reference voltage to produce an inhibit signal when said sense voltage falls outside normal operating ranges; and
   means responsive to said inhibit signal for inhibiting operation of said switch means to prevent current flow through said transformer primary winding to shut down power supply operation.

2. The electrostatic precipitator according to claim 1 wherein said timing means includes means for producing said enabling signal of a predetermined duration less than said predetermined time.

3. The electrostatic precipitator according to claim 1 wherein said timing means comprises means for charging a capacitor at a predetermined rate and threshold means for producing said enable signal when a predetermined voltage is attained on said capacitor.

4. The electrostatic precipitator according to claim 3 wherein said means for producing said enabling signal includes secondary timing means for producing an enabling signal of a predetermined duration less than said predetermined time.

5. The electrostatic precipitator according to claim 4 wherein said threshold means comprises means for producing a trigger pulse when said predetermined voltage is attained on said capacitor, and said secondary timing means includes gate means responsive to said trigger pulse for gating said capacitor voltage for a predetermined duration to form said enable signal.

6. The electrostatic precipitator according to claim 5 wherein said threshold means comprises a diac.

7. The electrostatic precipitator according to claim 6 including means for inhibiting charging of said capacitor during normal power supply operation.

8. The electrostatic precipitator according to claim 1 wherein said ionizer and said attenuator means are connected to said high voltage secondary winding of said transformer and said attenuator means comprises means for producing a relatively high voltage less than the ionizer voltage for charging said collector cell and voltage divider means having a tap producing a relatively low voltage less than said voltage for charging said collector cell and comprising said sense voltage.

9. The electrostatic precipitator according to claim 8 wherein said cell voltage producing means comprises a second voltage divider means connected to the high voltage secondary winding of said transformer.

10. The electrostatic precipitator according to claim 8 wherein said cell voltage producing means comprises a second tap on said resistor divider means.

11. The electrostatic precipitator according to claim 8 including a tertiary winding in combination with said transformer for producing a relatively low voltage less than said collector cell voltage and means utilizing said tertiary winding voltage to produce said reference voltage.

12. The electrostatic precipitator according to claim 11 wherein said comparison means operates to produce said inhibit signal when said sense signal is less than said reference voltage.

13. The electrostatic precipitator according to claim 12 wherein the output from said comparison means is connected to said enable signal and operates to maintain said switch means in a conducting state to permit current flow through the primary winding of said transformer during normal power supply operation and to maintain said switch means in a non-conducting state to prevent current flow through the primary winding of said transformer when said sense signal is less than said reference voltage during an overload condition.

14. The electrostatic precipitator according to claim 13 including means for preventing charging of said capacitor when said tertiary winding voltage is within normal operating limits and permitting charging of said capacitor when said tertiary winding voltage decreases.

15. The electrostatic precipitator according to claim 14 wherein said charge preventing means includes means for permitting charging of said capacitor a predetermined time after decrease of the tertiary winding voltage.

* * * * *